United States Patent
Huang

(10) Patent No.: US 7,703,522 B2
(45) Date of Patent: Apr. 27, 2010

(54) METHODS OF UNDERGROUND FORMATION CONSOLIDATION

(75) Inventor: Tianping Huang, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 35 days.

(21) Appl. No.: 12/122,854

(22) Filed: May 19, 2008

(65) Prior Publication Data

US 2010/0038085 A1  Feb. 18, 2010

(51) Int. Cl.
*E21B 33/13* (2006.01)
*E21B 43/27* (2006.01)

(52) U.S. Cl. .................. 166/281; 166/293; 166/300; 166/307

(58) Field of Classification Search .............. None
See application file for complete search history.

(56) References Cited

U.S. PATENT DOCUMENTS

| | | | |
|---|---|---|---|
| 3,593,796 A | 7/1971 | Stainback et al. | |
| 3,741,308 A | 6/1973 | Veley | |
| 4,799,549 A | 1/1989 | Vinot et al. | |
| 5,168,928 A | 12/1992 | Terry et al. | |
| 6,059,036 A | 5/2000 | Chatterji et al. | |
| 6,554,067 B1 | 4/2003 | Davies et al. | |
| 6,613,720 B1 | 9/2003 | Feraud et al. | |
| 6,805,198 B2 | 10/2004 | Huang et al. | |
| 7,111,683 B2 | 9/2006 | Nelson et al. | |
| 2004/0031611 A1 | 2/2004 | Huang et al. | |
| 2005/0159319 A1* | 7/2005 | Eoff et al. | 507/225 |
| 2008/0110624 A1 | 5/2008 | Nguyen et al. | |
| 2008/0125334 A1 | 5/2008 | Burns et al. | |

OTHER PUBLICATIONS

J. J. Bommer, et al., "The El Salvador Earthquakes of Jan. and Feb. 2001: Context, Characteristics and Implications for Seismic Risk," Soil Dynamics and Earthquake Engineering, 2002, vol. 22, pp. 389-418.
Written Opinion mailed Dec. 14, 2009, in corresponding PCT/US2009/040603.

* cited by examiner

*Primary Examiner*—Zakiya W. Bates
(74) *Attorney, Agent, or Firm*—Mossman Kumar & Tyler PC

(57) ABSTRACT

Unconsolidated formation sand in the near wellbore region may be uniformly consolidated using a system including a sodium silicate solution and a hardener, such as at least one dialkyl ester of a dicarboxylic acid. Subsequently, a low concentration acid, such as hydrofluoric (HF) acid, is pumped through and into the consolidated sand to create channels or passageways to connect the formation hydrocarbons with the wellbore for production of the hydrocarbons through the wellbore. Hydrofluoric acid may be generated in situ by hydrolyzing a substance to hydrofluoric acid where the substance may include ammonium bifluoride, ammonium fluoride, alkali metal fluorides, alkali metal bifluorides, transition metal fluorides, and the like, and mixtures thereof. The acid may instead or additionally include organic acids and other mineral acids.

19 Claims, 2 Drawing Sheets

Before acid     Pumping acid     After acid

METHODS OF UNDERGROUND FORMATION CONSOLIDATION

TECHNICAL FIELD

The present invention relates to methods and compositions to consolidate sand in the near wellbore region of a subterranean formation containing unconsolidated sand, and more particularly relates, in one embodiment, to such methods where acids are subsequently introduced to generate channels through the consolidated sand between the formation hydrocarbons and the wellbore.

TECHNICAL BACKGROUND

Hydrocarbon fluids, such as oil and natural gas, and other desirable formation fluids are obtained from a subterranean geologic formation, i.e., a reservoir, by drilling a well that penetrates the formation zone that contains the desired fluids. Once a wellbore has been drilled, the well must be completed, which involves the design, selection, and installation of equipment and materials in or around the wellbore for conveying, pumping, or controlling the production or injection of fluids.

When the subterranean formation is "soft" or poorly consolidated, small particulates (typically sand) present in the formation may dislodge and travel along with the produced fluid to the wellbore. Production of sand is undesirable since it erodes surface and subterranean equipment, and it must be removed from the produced fluids before they can be processed. In particular, the migrating sand can plug the flow channels in the formation and necessitate other stimulation techniques, such as acid stimulation, to restore the well's performance.

Various methods have been employed to reduce or eliminate the simultaneous production of sand and other particulates with the formation fluids. One common approach has been to filter the produced fluids through a gravel pack that has been placed into the wellbore. Such gravel packs are often retained by a metal screen. The produced formation fluids travel through the permeable gravel pack (and the screen) before entering the wellbore. The sand and other particulates in the produced fluids are blocked by the gravel pack. This technique has been widely used, but it has several disadvantages. Over time, the gravel pack and the screen may be plugged by scale or particles, or badly eroded by the sand and other particulates in the produced fluids. This reduces the effectiveness of the gravel pack and screen and may actually shut down the production if the gravel pack and/or screen becomes plugged with sand or formation fines. Additionally, the presence of the metal screen in the well inhibits reentry of drills and other tools into the wellbore and the metal screen can be difficult and costly to remove.

It is thus desirable to develop so-called screenless completion techniques. These techniques typically involve the injection of a consolidating fluid, such as a resin-based consolidating fluid, through the wellbore and into the formation surrounding the interval of interest. Resin-based consolidating fluids generally include an organic resin, a curing agent, a catalyst and an oil wetting agent. The resin system hardens in the formation, thereby consolidating it. Resin-based consolidation systems may be complicated to apply, especially those involving multiple treatment stages, and the treatment results may be erratic. When the individual components of the consolidating fluid are pumped at different stages into the formation they may or may not come together in the right order, or in the right amounts, or they may not even come into contact at all. And, if they do combine, good mixing of the components is not assured. This difficulty helps explain the erratic and unreliable results that operators have experienced using such multi-stage consolidating fluids.

In an effort to overcome some of the disadvantages of resin-based consolidation fluids, other well treatments have been proposed which use inorganic systems to modify the formation and thereby reduce the production of sand and fines.

For example, U.S. Pat. No. 3,593,796 describes a multi-stage process in which the following components are injected sequentially into the formation: (1) an aqueous solution containing a silicate adapted to wet the fine sand grain particles, (2) an aqueous solution of a silicate-precipitating agent capable of reacting with the silicate in solution (1) so as to form a solidifying material and therein to bind the fine sand grain particles, and (3) a solution containing an oil-wetting agent. This treatment is designed to immobilize the fine particles in the formation and prevent their migration when subjected to subsequent fluid flow. The aqueous solutions of alkaline earth metal salts (e.g., calcium chloride), acidic iron salts, and certain other metal salts can be used as the silicate-precipitating agent.

In another instance, U.S. Pat. No. 3,741,308 describes a method of converting an unconsolidated sand formation into a consolidated, permeable formation by flowing volumes of aqueous calcium hydroxide (or compounds which hydrolyze or react with each other to form calcium hydroxide) through the pores of the unconsolidated formation. The calcium hydroxide solution could be formed by adding sodium hydroxide to a solution of calcium chloride. In the practice of this process the sand particles in the formation become coated with calcium silicates of unknown or indefinite composition, and it is proposed that the coating cements the individual grains together and increases the structural strength of the sand assemblage.

In essentially all multistage consolidation treatments, there is an element of chance in whether the reactants and components will be combined in the formation in the proper order, the proper amounts, or whether they will even come in contact at all in the desired formation interval of interest. The efficiency of mixing or blending is also questionable.

Though some of the above-mentioned techniques have achieved a degree of commercial success, many of them have been hindered by technical and/or cost limitations. It would thus be desirable to provide a method by which unconsolidated sands could be successfully consolidated while also providing an effective technique for establishing suitable communication through the consolidated sands between the formation fluids and the wellbore.

SUMMARY

There is provided, in one form, a subterranean formation consolidation method that includes injecting through a wellbore into a subterranean formation containing unconsolidated sand and formation hydrocarbons a particular composition. The composition includes at least one hardener, at least one alkali metal silicate, and water. The composition is permitted to form a silica gel in the subterranean formation for a period of time effective to consolidate the unconsolidated sand adjacent the wellbore to form consolidated sand. Subsequently at least one acid is introduced into the consolidated sand to generate channels there through thus connecting the formation hydrocarbons and the wellbore.

DETAILED DESCRIPTION

Figure 1A:
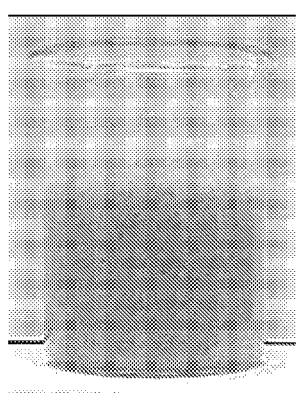
FIG. 1A is a photograph of a beaker containing 20/40 mesh (425/850 micron) sand and a composition including a hardener, an alkali metal silicate and water, before gelation.

It has been discovered that a composition known to function as a water and/or gas shut-off product may be surprisingly used to uniformly consolidate unconsolidated formation sand in the near wellbore region of a subterranean formation, where the larger formation or reservoir also contains hydrocarbon formation fluids, such as oil and/or gas. After the unconsolidated sand is uniformly consolidated, a low concentration acid, such as hydrofluoric (HF) acid, may be introduced, such as by pumping, through the consolidated region to generate channels to connect the formation hydrocarbons with the wellbore for the production of those hydrocarbons. The near wellbore region is defined as being up to 20 feet (about 6 meters) away from the wellbore.

As will be demonstrated, laboratory tests showed that 20/40 mesh (425/850 micron) sand and 6 mm diameter glass beads may be uniformly consolidated by silica gel that may be formed by a solution of sodium silicate and dibasic esters. An acid, such as HF acid generated from ammonium bifluoride (ABF) may generate or produce a channel, similar to a wormhole in carbonate acidizing, penetrating the consolidated sand or glass bead pack. The consolidated glass beads (analogous to consolidated sand) keeps its integrity and no glass beads fall from the consolidated pack after a channel is penetrated through or generated in the consolidated pack.

The present method includes a silica gel-based system previously known for zone isolation and flow control water shut-off applications. A commercially implemented embodiment of this silica gel-based system is PERMPLUG™ available from Baker Oil Tools. The fluid system comprises sodium silicate solution and a hardener that is added just prior to pumping to form a single staged treatment. The hardener is selected from a group of dialkyl esters of dicarboxylic acids including, but not necessarily limited to, dimethyl succinate, dimethyl glutarate, and dimethyl adipate, or mixtures thereof.

The fluid system is pumped into the target zone where silica gel is generated in situ uniformly. Since silica gel formation occurs in situ, better control on the placement of the treatment is achieved and deeper penetration of the consolidation fluid is accomplished with substantially all of the consolidated sands of the target zone receiving sufficient components to form the silica gel.

A series of laboratory tests have shown that the system can successfully consolidate unconsolidated zones in various reservoir conditions from about 70° F. to about 300° F. (about 21° C. to about 149° C.). It is expected that the method and compositions herein may be effectively used in a broader temperature range between about 50° F. to about 350° F. (about 10° C. to about 177° C.). The system has very low viscosity before gelling, which means easy pumping, and has a wide range of gelling times and strengths depending on the type and amount of additives used just prior to use. Without wishing to be limited to any particular parameter range, it is expected that in one embodiment herein, the gel strength of the gels formed will range from about 500 to about 15,000 cP, alternatively from about 1000 cP independently up to about 10,000 cP. The single stage treatment may be pumped into targeted formations to provide permanent sand consolidation.

As noted, the hardener used in the composition is at least one dialkyl ester of a dicarboxylic acid. The hardener may have the formula:

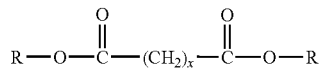

where R is independently selected from straight or branched alkyl groups of 1 to 4 carbon atoms and where x ranges from 1 to 6 carbon atoms. Stated another way, the at least one dialkyl ester of a dicarboxylic acid has alkyl groups independently selected from straight or branched alkyl groups of 1 to 4 carbon atoms, and where the dicarboxylic acid used to make the ester has from 1 to 8 carbon atoms. In a non-limiting, preferred embodiment, the at least one dialkyl ester of a dicarboxylic acid includes, but is not necessarily limited to, dimethyl succinate, dimethyl glutarate, dimethyl adipate, and mixtures thereof.

The alkali metal silicate of the composition herein may include, but is not necessarily limited to, sodium silicate, potassium silicate, and sodium/-potassium silicate mixtures, in another non-limiting embodiment.

Although the proportional makeup of the composition herein may vary widely depending upon a number of factors including, but not necessarily limited to, the nature of the formation, the formation conditions (e.g. temperature, pressure, permeability, etc.), the particular composition components, the injection method, the interaction of these various factors, and the like, in one non-limiting embodiment, the composition comprises from about 0.5 to about 2.5 volume/volume/0 (v/v %) hardener, from about 0.025 to about 10.00 v/v % alkali metal silicate, based on the total composition. In an alternative, non-restrictive version, the composition comprises from about 0.5 to about 1.5 v/v % hardener, from about 1.00 to about 2.50 v/v % alkali metal silicate, based on the total composition. Water may form the balance of the composition. Other components may be added, including, but not necessarily limited to, quaternary amines, alkoxylated quaternary amines, and alkoxylated phenols and alcohols (typically ethoxylated phenols and alcohols). These additives can help reduce clay swelling and/or reduce surface tension for more even distribution of the components.

It will be appreciated that although the methods and compositions herein may be able to completely consolidate unconsolidated materials, such as sands, in the near-wellbore region of subterranean formations, the methods and compositions should be considered successful even if less than complete consolidation is accomplished. Inhibition, reduction, diminishing, decreasing, and lessening of the production of sand through the use of gels described herein are all considered successful, as are the complete prevention, cessation, stoppage, end and termination of sand production, that is, complete control of any sand coming from the formation during hydrocarbon production. As noted, the gel is permitted to form in the subterranean formation, particularly the near-wellbore region. The time that this gel-forming and sand consolidation takes place may range over a wide range, in one non-limiting embodiment, from about 1 to about 24 hours. Alternatively, the time effective to consolidate the sand adjacent the wellbore may range from about 3 hours independently up to about 12 hours. More information about the silica gel-forming compositions and methods may be found by reference to U.S. Patent Application Publication 2004/0031611 A1, incorporated herein by reference in its entirety.

In one non-limiting embodiment herein, the present method is practiced in the absence of a gas, and/or in the absence of a non-esterified organic acid.

Various acids may be subsequently introduced to and into the consolidated sand to generate, produce, and/or etch channels, passageways, wormholes, etc. Suitable mineral acids include, but are not necessarily limited to, hydrofluoric acid alone, or mixed with hydrochloric acid. Suitable organic acids mixed with hydrofluoric acid include, but are not necessarily limited to, acetic acid, formic acid, succinic acid, glutaric acid, adipic acid, and mixtures thereof. The concentration of hydrofluoric acid is expected to be relatively low, for instance in the range of about 0.5 to about 10 wt % Alternatively, the acid concentration may range from about 1 independently up to about 5 wt %. The concentration of other acids not including hydrofluoric acid is 2 to 15 wt %. Thus, the total acid concentration may range from about 0.5 to about 25 wt %.

The organic acid fluid systems herein for acidization of the consolidated sand regions of the subterranean formations penetrated by a well bore may be used at temperatures in excess of about 200° F. (92° C.). It has been discovered that a particularly useful organic acid fluid contains at least one water-soluble dicarboxylic acid. In one non-limiting embodiment, the dicarboxylic acid is of relatively low molecular weight, that is, has a formula weight of 175 or less. Suitable dicarboxylic acids therefore include, but are not necessarily limited to, oxalic acid (ethanedioic acid), malonic acid (propanedioic acid), succinic acid (butanedioic acid), glutaric acid (pentanedioic acid), adipic acid (hexanedioic acid), pimelic acid (heptanedioic acid), and mixtures thereof. In an alternative version, the dicarboxylic acids include, but are not necessarily limited to succinic acid, glutaric acid, adipic acid, and mixtures thereof. Interestingly, glutaric acid, succinic acid, and adipic acid have been used as components for corrosion inhibitors for ferrous metals, according to U.S. Pat. No. 4,512,552. Mixtures of succinic acid, glutaric acid, and adipic acid are generally available as a by-product stream. Some suitable mixtures of organic acids for the methods herein are available from Baker Oil Tools as HTO Acid™.

The organic acid fluid systems with hydrofluoric acid described herein can effectively generate passageways, channels and wormholes to stimulate production in the previously-discussed consolidated sands of subterranean formations. Such fluids cause very low corrosion of tubing, casing and downhole equipment.

Based on the properties of glutaric acid, succinic acid and adipic acid, this composition of dicarboxylic acids and other combinations of acids (or dicarboxylic acids used alone) may be used as acid compositions to open up the consolidated sands for production, according to the methods herein. In addition to its reactivity, the acid system, when combined with corrosion inhibitor, exhibits very low corrosion at high temperatures. Corrosion tests show that at 350° F. (177° C.) the corrosion rate caused by this organic acid is 0.001 lb/ft$^2$ (0.005 kg/m$^2$) on 22-Cr duplex stainless steel for 16 hours. Acid soaking to generate and produce channels to connect formation hydrocarbons and the wellbore is now possible at temperatures in excess of 200° F. (92° C.). In one non-limiting embodiment, an alternative operating temperature range is from about 300° F. (149° C.) independently up about 350° F. (177° C.). These acids may also produce or generate channels use to inject fluid, such as water floods, from the wellbore through the consolidated sands, into the subterranean formation to urge the hydrocarbons toward a producing well in a secondary recovery process.

In some non-limiting embodiments herein, hydrofluoric acid may be used together with the dicarboxylic acids herein. Hydrofluoric acid may be used to aid in dissolving silicates, such as those of the silica gel used to consolidate the sands in the near-wellbore region. Alternatively, the substance injected after sand consolidation may be a substance that hydrolyzes to hydrofluoric acid. Suitable substances include, but are not necessarily limited to, ammonium bifluoride (ABF) and ammonium fluoride (AF), alkali metal fluorides and bifluorides (where the alkali metal is typically sodium, potassium or the like) as well as transition metal fluorides (for instance hexafluorotitanate salts and the like) and mixtures thereof.

In one non-limiting embodiment of the methods and compositions herein however, the acid composition involves an absence of excess fluoride. Excess fluoride is defined as that greater than the amount necessary to form all the possible HF.

It will be appreciated that it is difficult to specify with precision the amount of dicarboxylic acid that must be used to effectively acidize a particular consolidated sand in a subterranean formation, in general. A number of complex, interrelated factors must be taken into account that would affect such a proportion, including but not necessarily limited to, the temperature of the formation, the pressure of the formation, the particular fines and scales present in the formation (e.g. calcium carbonate, silicates, and the like), the particular dicarboxylic acid(s) used, the expected contact time of the acid composition with the formation, etc.

In one non-limiting embodiment, the contact times are determined from the maximum pumping rate that does not cause the downhole pressure to exceed the fracturing pressure. This type of treatment would be similar to a "matrix" acid job. In some non-restrictive versions, contact times may be based on laboratory tests, but usually range from about 10 minutes to about 60 minutes with the most common time being about 30 minutes.

Suitable solvents or diluents for the acid compositions herein include, but are not necessarily limited to, water, methanol, isopropyl alcohol, alcohol ethers, aromatic solvents, and mixtures thereof. In another non-restrictive version, the composition has an absence of monocarboxylic acids and/or an absence of tricarboxylic acids. Alternatively, in another embodiment, the acid composition has an absence of quaternary ammonium compounds and/or an absence of sulfur-containing corrosion inhibitor activator (e.g. thioglycolic acid, alkali metal sulfonate, etc.). In one non-limiting embodiment, a goal may be to avoid the use of strong mineral acids, such as HCl and/or $H_2SO_4$, so these acids should be absent from the acid composition in one embodiment. This is to avoid potential corrosion problems with surface and downhole equipment. The acid compositions herein are intended to replace the mineral acid systems previously used, in one non-limiting aspect. The optional use of hydrofluoric acid (noted above) is an exception to these considerations about mineral acids.

However, in another non-restrictive aspect, mineral acids such as hydrochloric acid, sulfuric acid, phosphoric acid, and the like may be employed. Further details about the acid systems suitable for use in the methods herein may be found in U.S. Pat. No. 6,805,198, incorporated herein by reference in its entirety.

The invention will be further illustrated with respect to certain experiments, but these examples are not intended to limit the invention, but only to further describe it in certain specific, non-limiting embodiments.

Example 1

Shown in FIG. 1A is a photograph of a beaker containing PERM-PLUG™, available from Baker Oil Tools. This beaker contains 20/40 mesh (425/850 micron) sand together with 40 ml 6.7 by % FLC-1L and 1.5 ml FLH-1L at 70° F. (21° C.) before gelation. FLC-1L is a 37.5% by weight (bw) sodium silicate solution (40~42° Bé from Fisher Scientific). FLH-1L is DBE, a dibasic ester mixture of dimethyl glutarate, dimethyl adipate and dimethyl succinate, available from DuPont. The solution formulation may be found in U.S. Patent Application Publication 2004/0031611 A1, previously incorporated herein by reference.

Figure 1B:
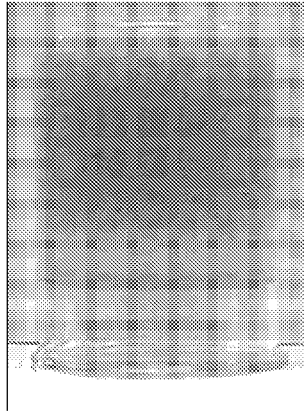
FIG. 1B is a photograph of the beaker of FIG. 1A after gelation, with the beaker inverted.
Figure 1C:
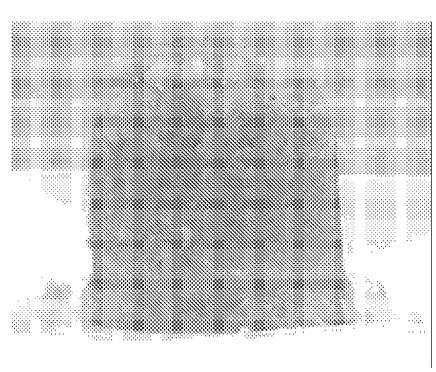
FIG. 1C is a photograph of the consolidated sand from FIG. 1B after the beaker has been removed.

After gelling (or gelation) of the composition, the beaker was inverted and the photograph of FIG. 1B was taken, the sand consolidated by the gel of the composition remained in the bottom of the beaker.

Shown in FIG. 10 is the consolidated sand after the beaker has been removed. It may be seen that the 20/40 mesh (425/850 micron) sand used in Example 1 was successfully, completely and uniformly consolidated by the silica gel. Example 1 was conducted at 70° F. (21° C.).

Example 2

Figures 2A, 2B, 2C, 2D, 2E:
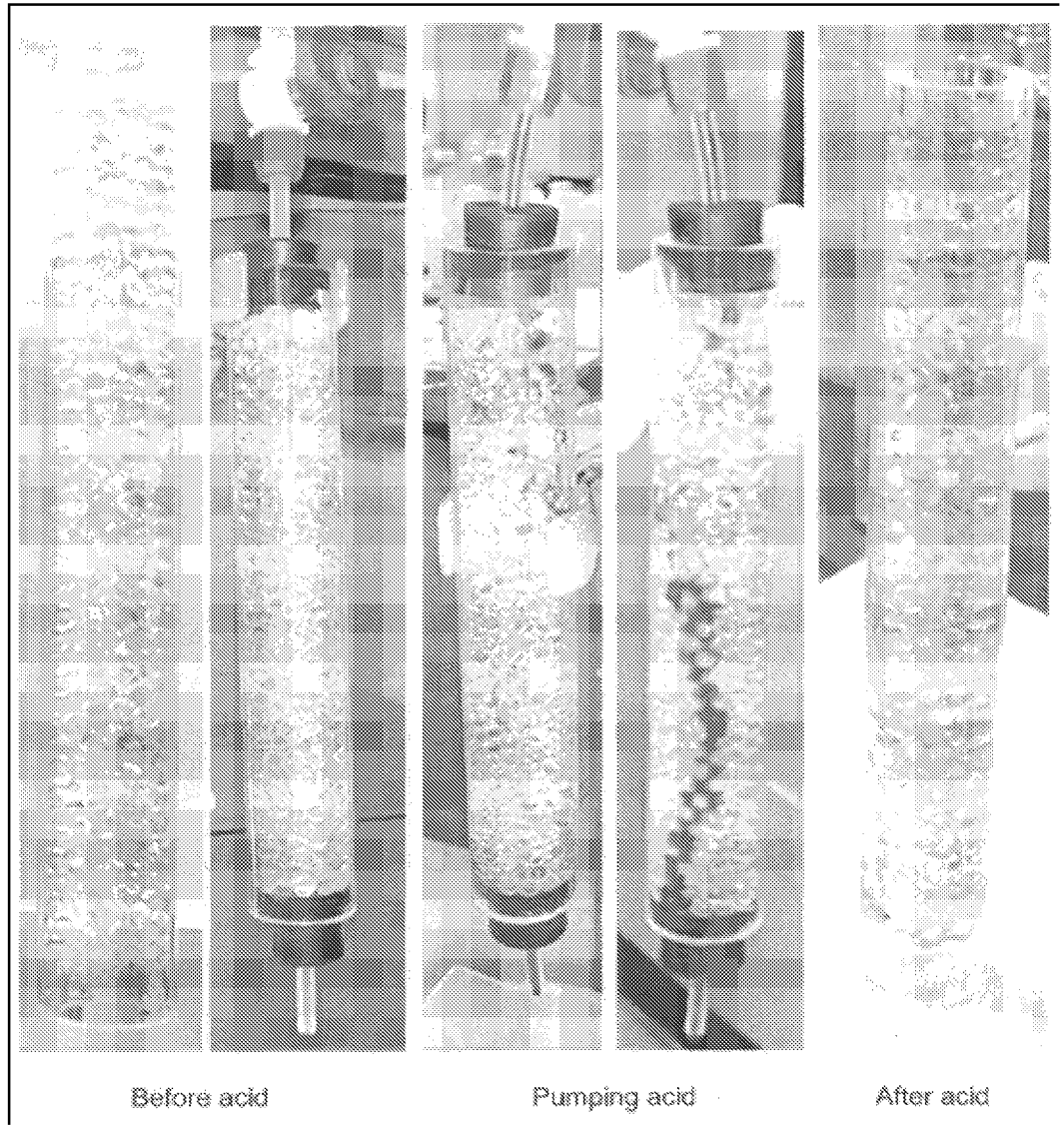
FIG. 2A is a photograph of a 1-inch (2.5 cm) ID and 18 inches (46 cm) long acrylic tube filled with 6-mm diameter glass beads and a composition including a hardener, an alkali metal silicate and water, after gelation.
FIG. 2B is a photograph of the filled tube of FIG. 2A sealed with two rubber connections to prepare injecting acid through the tube.
FIGS. 2C and 2D are sequential photographs after the glass beads have been uniformly consolidated and the top and bottom ends of the tube have been sealed with rubber connections, where a dyed acid has been introduced to generate a channel or pathway through the consolidated glass beads from the top of the tube to the bottom of the tube.
FIG. 2E is a photograph of the tube after the acid has generated the channel or pathway and the acid has been substantially removed, and the rubber connections have been removed, demonstrating that the glass beads remain in place.

In the photograph of FIG. 2A is shown a 1-inch (2.5 cm) ID and 18 inches (46 cm) long acrylic tube filled with 6-mm diameter glass beads, used to simulate an unconsolidated near-wellbore formation. Unconsolidated formation sand is usually less than 20 mesh (850 micron), which is much smaller than 6-mm diameter glass beads. This Example indicates that the silica gel has enough strength to hold the bigger beads, which means it is effective and easier to consolidate formation sands using the methods described herein. The composition used in Example 1 was then introduced into the acrylic tube and the glass beads were consolidated with the silica gel. After consolidation, the top and bottom ends of the tube were sealed with rubber connections and ports for introducing acid flow into the top of the tube and removing the acid from the bottom of the tube. This apparatus is shown in FIG. 2B.

Shown in FIG. 2C is acid being pumped through the acrylic tube; the acid was dyed red and shows dark in FIGS. 2C and 2D. Ammonium bifluoride (ABF) mixing with HTO acid was pumped from the top of the tube to the bottom at a rate of 1 ml/min. Hydrofluoric acid was generated by hydrolyzing ABF with HTO acid as described in U.S. Pat. No. 6,805,198.

The acid reacted with the silica gel and flowed in the porous, consolidated media to generate a channel, analogous to a wormhole in carbonate acidizing, penetrating the glass beads pack.

After the acid treatment and the acid had penetrated the consolidated pack and generated a flow channel in the acrylic tube, the rubber connections at the top and bottom ends of the tube were removed. The consolidated glass beads kept their integrity, and no glass beads fell from the consolidated pack as shown in the photograph of FIG. 2E.

In the foregoing specification, the invention has been described with reference to specific embodiments thereof, and has been demonstrated as effective in providing a method for consolidating unconsolidated sands of the near-wellbore region in subterranean formations. However, it will be evident that various modifications and changes may be made to the inventive compositions and methods without departing from the broader spirit or scope of the invention as set forth in the appended claims. Accordingly, the specification is to be regarded in an illustrative rather than a restrictive sense. For example, specific combinations of hardeners, catalysts, alkali metal silicates, acids, and other components falling within the claimed parameters, but not specifically identified or tried in a particular method or composition, or under specific conditions not exemplified herein, are anticipated to be within the scope of this invention.

The present invention may suitably comprise, consist or consist essentially of the elements disclosed and may be practiced in the absence of an element not disclosed.

The words "comprising" and "comprises" as used throughout the claims is to interpreted "including but not limited to".

The invention claimed is:

1. A subterranean formation consolidation method comprising:
    injecting through a wellbore into a subterranean formation containing unconsolidated sand and formation hydrocarbons a composition comprising:
        at least one hardener,
        at least one alkali metal silicate, and
        water; and
    permitting the composition to form silica gel in the subterranean formation for a period of time effective to consolidate the unconsolidated sand adjacent the wellbore to form consolidated sand; and
    introducing at least one acid into the consolidated sand to generate channels through the consolidated sand thereby connecting the formation hydrocarbons and the wellbore, where the at least one acid comprises hydrofluoric acid.

2. The method of claim 1 where the hardener comprises at least one dialkyl ester of a dicarboxylic acid.

3. The method of claim 2 where the at least one dialkyl ester of a dicarboxylic acid has alkyl groups independently selected from straight or branched alkyl groups of 1 to 4 carbon atoms, and where the dicarboxylic acid used to make the ester has from 1 to 8 carbon atoms.

4. The method of claim 2 where the at least one dialkyl ester of a dicarboxylic acid is selected from the group consisting of dimethyl succinate, dimethyl glutarate, dimethyl adipate, and mixtures thereof.

5. The method of claim 1 where the composition comprises from about 0.50 to about 2.50 v/v % hardener, and from about 0.025 to about 10.00 v/v % alkali metal silicate, based on the total composition.

6. The method of claim 1 where the acid is selected from the group consisting of:
   (a) mineral acids selected from the group consisting of hydrofluoric acid, hydrochloric acid, sulfuric acid, phosphoric acid, and mixtures thereof;
   (b) organic acids selected from the group consisting of acetic acid, formic acid, succinic acid, glutaric acid, adipic acid, and mixtures thereof; and
   (c) mixtures thereof.

7. The method of claim 1 where the method further comprising hydrolyzing a substance to the hydrofluoric acid where the substance is selected from the group consisting of ammonium bifluoride, ammonium fluoride, alkali metal fluorides, alkali metal bifluorides, transition metal fluorides, and mixtures thereof.

8. The method of claim 1 where the acid comprises hydrofluoric acid and the acid concentration introduced into the consolidated sand ranges from about 0.5 to about 10 wt %.

9. A subterranean formation consolidation method comprising:
   injecting through a wellbore into a subterranean formation containing unconsolidated sand and formation hydrocarbons a composition comprising:
      at least one hardener comprising at least one dialkyl ester of a dicarboxylic acid,
      at least one alkali metal silicate, and
      water; and
   permitting the composition to form silica gel in subterranean formation for a period of time effective to consolidate the unconsolidated sand adjacent the wellbore to form consolidated sand; and
   introducing at least one acid into the consolidated sand to generate channels through the consolidated sand thereby connecting the formation hydrocarbons and the wellbore where the acid is selected from the group consisting of:
      (a) mineral acids selected from the group consisting of hydrofluoric acid, hydrochloric acid, sulfuric acid, phosphoric acid, and mixtures thereof;
      (b) organic acids selected from the group consisting of acetic acid, formic acid, succinic acid, glutaric acid, adipic acid, and mixtures thereof; and
      (c) mixtures thereof,
      where the total acid concentration ranges from about 0.5 to about 25 wt %.

10. The method of claim 9 where the at least one dialkyl ester of a dicarboxylic acid has alkyl groups independently selected from straight or branched alkyl groups of 1 to 4 carbon atoms, and where the dicarboxylic acid used to make the ester has from 1 to 8 carbon atoms.

11. The method of claim 9 where the at least one dialkyl ester of a dicarboxylic acid is selected from the group consisting of dimethyl succinate, dimethyl glutarate, dimethyl adipate, and mixtures thereof.

12. The method of claim 9 where the composition comprises from about 0.50 to about 2.50 v/v % hardener, from about 0.025 to about 10.00 v/v % alkali metal silicate, based on the total composition.

13. The method of claim 9 where the acid comprises hydrofluoric acid and the method further comprising hydrolyzing a substance to the hydrofluoric acid where the substance is selected from the group consisting of ammonium bifluoride, ammonium fluoride, alkali metal fluorides, alkali metal bifluorides, transition metal fluorides, and mixtures thereof.

14. A subterranean formation consolidation method comprising:
   injecting through a wellbore into a subterranean formation containing unconsolidated sand and formation hydrocarbons a composition comprising:
      at least one hardener comprising at least one dialkyl ester of a dicarboxylic acid,
      at least one alkali metal silicate, and
      water; and
   permitting the composition to form silica gel in subterranean formation for a period of time effective to consolidate the sand adjacent the wellbore; and
   introducing at least one acid into the consolidated sand to generate channels through the consolidated sand thereby connecting the formation hydrocarbons and the wellbore, where the acid comprises hydrofluoric acid and the method further comprising hydrolyzing a substance to the hydrofluoric acid where the substance is selected from the group consisting of ammonium bifluoride, ammonium fluoride, alkali metal fluorides, alkali metal bifluorides, transition metal fluorides, and mixtures thereof, where the total acid concentration ranges from about 0.5 to about 25%.

15. The method of claim 14 where the at least one dialkyl ester of a dicarboxylic acid has alkyl groups independently selected from straight or branched alkyl groups of 1 to 4 carbon atoms, and where the dicarboxylic acid used to make the ester has from 1 to 8 carbon atoms.

16. The method of claim 14 where the at least one dialkyl ester of a dicarboxylic acid is selected from the group consisting of dimethyl succinate, dimethyl glutarate, dimethyl adipate, and mixtures thereof.

17. The method of claim 14 where the alkali metal silicate is sodium silicate.

18. The method of claim 14 where the composition comprises from about 0.50 to about 2.50 v/v % hardener, from about 0.025 to about 10.00 v/v % alkali metal silicate, based on the total composition.

19. The method of claim 14 where the acid further comprises at least one in addition to hydrofluoric acid which is selected from the group consisting of:
   mineral acids selected from the group consisting of hydrochloric acid, sulfuric acid, phosphoric acid, and mixtures thereof;
   organic acids selected from the group consisting of acetic acid, formic acid, succinic acid, glutaric acid, adipic acid, and mixtures thereof; and
   mixtures thereof.

* * * * *